United States Patent
Wang et al.

(10) Patent No.: US 12,001,129 B2
(45) Date of Patent: Jun. 4, 2024

(54) LIGHT MIXING MODULE AND LASER PROJECTOR HAVING THE SAME

(71) Applicant: BENQ CORPORATION, Taipei (TW)

(72) Inventors: Kai-Jiun Wang, Taoyuan (TW); Hung-Chi Tsai, Taoyuan (TW); Shuang-Xi Lin, Taoyuan (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 17/991,918

(22) Filed: Nov. 22, 2022

(65) Prior Publication Data

US 2023/0333457 A1    Oct. 19, 2023

(30) Foreign Application Priority Data

Apr. 13, 2022   (TW) .................................. 111114011

(51) Int. Cl.
   *G03B 21/20*   (2006.01)
(52) U.S. Cl.
   CPC ..... *G03B 21/2033* (2013.01); *G03B 21/2013* (2013.01); *G03B 21/2073* (2013.01); *G03B 21/208* (2013.01)
(58) Field of Classification Search
   CPC ............ G02B 21/2033; G02B 21/2013; G02B 21/2073; G02B 21/208
   USPC .......................................................... 353/20
   See application file for complete search history.

(56) References Cited

U.S. PATENT DOCUMENTS

| 9,304,323 | B2 * | 4/2016 | Khrushchev ........... G03B 21/28 |
| 10,819,961 | B2 * | 10/2020 | Tanaka ............... G02B 27/0933 |
| 2021/0294195 | A1 * | 9/2021 | Huang ................. G03B 21/142 |

FOREIGN PATENT DOCUMENTS

| CN | 113867088 A | 12/2021 |
| CN | 114200752 A | 3/2022 |
| TW | 202014789 A | 4/2020 |

OTHER PUBLICATIONS

Office action of counterpart application by Taiwan IP Office dated Nov. 2, 2022.

* cited by examiner

*Primary Examiner* — Jerry L Brooks

(57) ABSTRACT

A light mixing module is provided. The light mixing module includes a first laser array, a second laser array, and one or more laser polarized fold mirrors. The first laser array is configured for emitting a plurality of polarized light beams having a first polarization state. The second array is configured for emitting a plurality of polarized light beams having the first polarization state. The second laser array is disposed opposite to the first laser array. The one or more laser polarized fold mirrors are disposed between the first laser array and the second laser array. The one or more laser polarized fold mirrors reflect the polarized light beams emitted by the first laser array and the polarized light beams emitted by the second laser array. Each one of the one or more laser polarized fold mirrors is configured to direct light beams from at least two different directions.

12 Claims, 3 Drawing Sheets

LIGHT MIXING MODULE AND LASER PROJECTOR HAVING THE SAME

This application claims the benefit of Taiwan application Serial No. 111114011, filed on Apr. 13, 2022, the disclosure of which is incorporated by reference herein in its entirety.

TECHNICAL FIELD

This disclosure relates to a light mixing module and a laser projector having the same. More particularly, this disclosure relates to a light mixing module comprising a laser polarized fold mirror and a laser projector having the same.

BACKGROUND

Multi-color laser projectors, such as RGB laser projectors, are the most popular choice for solid-state projectors in recent years. Since laser sources have characteristics of good wave monochromaticity, high gain of Helmholtz-Kohlrausch effect (H-K effect), and the like, combination thereof can cover 90% or more of the color gamut of natural colors seen by the human eye, and perfect color reproduction can be achieved. In addition, laser sources have ultra-high brightness and long service life, which greatly reduces the maintenance cost in the later period. At the same time, laser projectors can be started and reach the working brightness almost instantaneously, and thus the laser projectors can be turned on and off quickly.

SUMMARY

This disclosure relates to a light-combining optical path design for polarization-type multi-color laser sources for further improvement of a multi-color laser projector.

In one aspect of the disclosure, a light mixing module is provided. The light mixing module comprises a first laser array, a second laser array, and one or more laser polarized fold mirrors. The first laser array is configured for emitting a plurality of polarized light beams having a first polarization state. The second laser array is configured for emitting a plurality of polarized light beams having the first polarization state. The second laser array is disposed opposite to the first laser array. The one or more laser polarized fold mirrors are disposed between the first laser array and the second laser array. The one or more laser polarized fold mirrors reflect the polarized light beams emitted by the first laser array and the polarized light beams emitted by the second laser array. Each one of the one or more laser polarized fold mirrors is configured to direct light beams from at least two different directions.

In another aspect of the disclosure, a laser projector is provided. The laser projector comprises a light source system, a light pipe, and an illuminating system. The light source system comprises a light mixing module and a lens module. The light mixing module comprises a first laser array, a second laser array, and one or more laser polarized fold mirrors. The first laser array is configured for emitting a plurality of polarized light beams having a first polarization state. The second laser array is configured for emitting a plurality of polarized light beams having the first polarization state. The second laser array is disposed opposite to the first laser array. The one or more laser polarized fold mirrors are disposed between the first laser array and the second laser array. The one or more laser polarized fold mirrors reflect the polarized light beams emitted by the first laser array and the polarized light beams emitted by the second laser array. Each one of the one or more laser polarized fold mirrors is configured to direct light beams from at least two different directions. The lens module is disposed at a light downstream side of the light mixing module. The light pipe is disposed at a light downstream side of the light source system. The illuminating system is disposed at a light downstream side of the light pipe.

Figure 1:
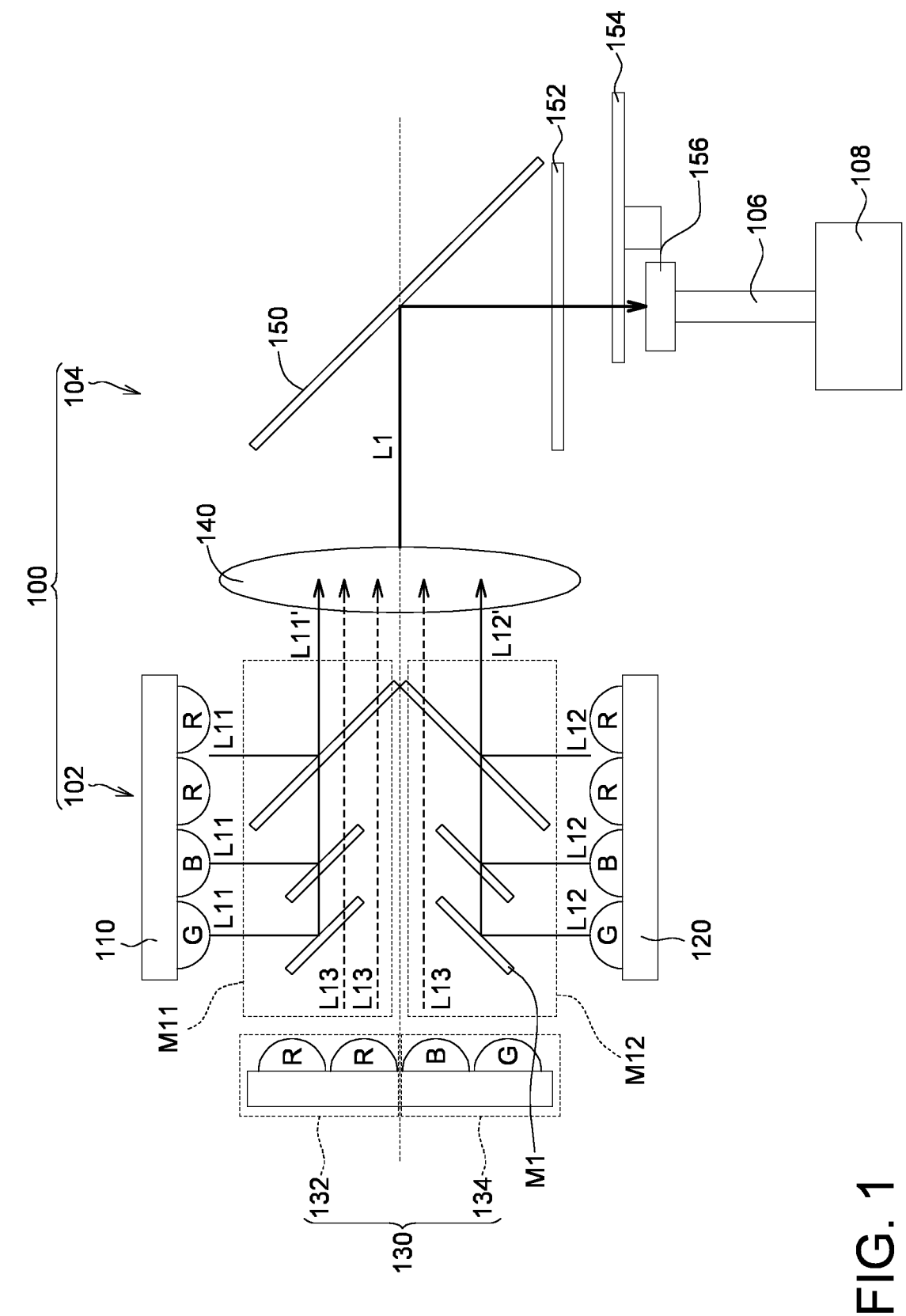
FIG. 1 schematically shows an exemplary laser projector.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In one aspect of the disclosure, a light mixing module is provided. The light mixing module comprises a first laser array, a second laser array, and one or more laser polarized fold mirrors. The first laser array is configured for emitting a plurality of polarized light beams having a first polarization state. The second laser array is configured for emitting a plurality of polarized light beams having the first polarization state. The second laser array is disposed opposite to the first laser array. The one or more laser polarized fold mirrors are disposed between the first laser array and the second laser array. The one or more laser polarized fold mirrors reflect the polarized light beams emitted by the first laser array and the polarized light beams emitted by the second laser array. Each one of the one or more laser polarized fold mirrors is configured to direct light beams from at least two different directions.

In another aspect of the disclosure, a laser projector is provided. The laser projector comprises a light source system, a light pipe, and an illuminating system. The light source system comprises a light mixing module and a lens module. The light mixing module comprises a first laser array, a second laser array, and one or more laser polarized fold mirrors. The first laser array is configured for emitting a plurality of polarized light beams having a first polarization state. The second laser array is configured for emitting a plurality of polarized light beams having the first polarization state. The second laser array is disposed opposite to the first laser array. The one or more laser polarized fold mirrors are disposed between the first laser array and the second laser array. The one or more laser polarized fold mirrors reflect the polarized light beams emitted by the first laser array and the polarized light beams emitted by the second laser array. Each one of the one or more laser polarized fold mirrors is configured to direct light beams from at least two different directions. The lens module is disposed at a light downstream side of the light mixing module. The light pipe is disposed at a light downstream side of the light source system. The illuminating system is disposed at a light downstream side of the light pipe.

Various embodiments will be described more fully hereinafter with reference to accompanying drawings. For clarity, the components may not be drawn to scale. In addition, some components and/or reference numerals may be omitted from some drawings. It is contemplated that the elements and features of one embodiment can be beneficially incorporated in another embodiment without further recitation.

Referring to FIG. 1, an exemplary laser projector 10 is shown. The laser projector 10 has a light mixing module 102 according to embodiments. Specifically, the laser projector 10 comprises a light source system 100. The light source system 100 comprises a light mixing module 102 comprises a light mixing module 104, the details of which will be provided in following paragraphs. The laser projector 10 further comprises a light pipe 106 and an illuminating system 108. The light pipe 106 is disposed at a light downstream side of the light source system 100. The illuminating system 108 is disposed at a light downstream side of the light pipe 106.

As to the light source system 100, the light mixing module 102 comprises a first laser array 110 and a second laser array 120. The first laser array 110 is configured for emitting a plurality of polarized light beams L11 having a first polarization state. The second laser array 120 is configured for emitting a plurality of polarized light beams L12 having the first polarization state. The first polarization state is, for example, S polarization state, but not limited thereto. The polarized light beams having the first polarization state are shown in solid lines in the figures. The second laser array 120 is disposed opposite to the first laser array 110. According to some embodiments, laser sources of different colors may be disposed in the first laser array 110 and the second laser array 120 in a symmetrical manner. As shown in FIG. 1, red laser sources R, green laser sources G, and blue laser sources B are each disposed in the first laser array 110 and the second laser array 120 in a symmetrical manner.

Figure 2:
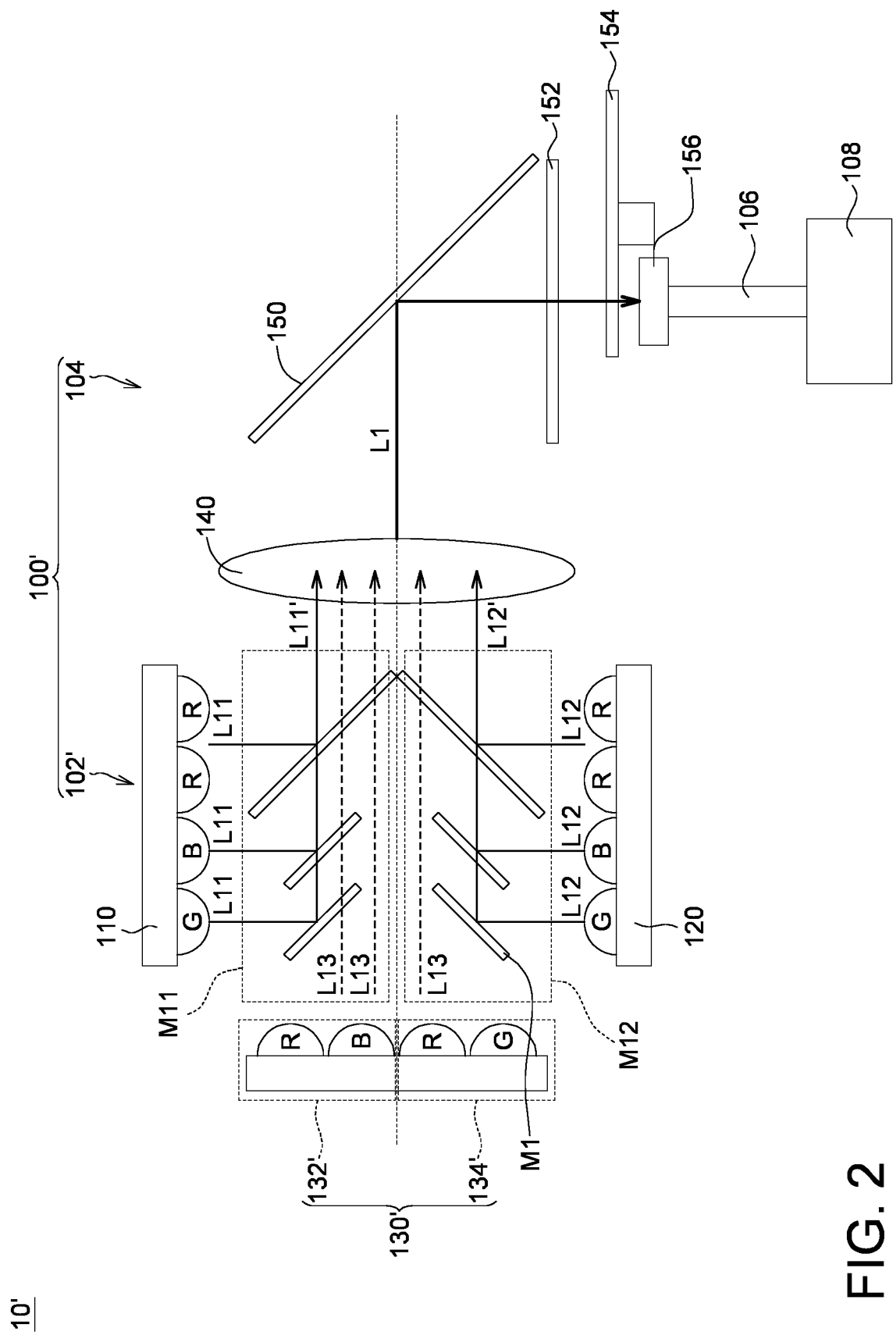
FIG. 2 schematically shows another exemplary laser projector.

The light mixing module 102 further comprises a third laser array 130. The third laser array 130 is configured for emitting a plurality of polarized light beams L13 having a second polarization state. The second polarization state is, for example, P polarization state, but not limited thereto. The polarized light beams having the second polarization state are shown in dotted lines in the figures. The third laser array 130 comprises a first portion 132 and a second portion 134. In some embodiments, as shown in FIG. 1, the first portion 132 and the second portion 134 may not comprise light sources of the same color. In some other embodiments, light sources of at least one same color are disposed in the first portion 132 and the second portion 134 of the third laser array 130. For example, referring to FIG. 2, a laser projector 10' similar to the laser projector 10 is shown. However, in the light mixing module 102' of its light source system 100', both of the first portion 132' and the second portion 134' of the third laser array 130' comprise a red laser source R.

It can be understood that the combinations of the RGB laser light sources are provided only for example. Other combinations of laser light sources of different colors, different light source arrangements, and/or the like may be used in the first laser array 110, the second laser array 120, and the third laser array 130 of the disclosure. However, the uniformity of polychromatic composite light will be better.

The light mixing module 102 comprises one or more laser polarized fold mirrors M1. The laser polarized fold mirrors M1 are disposed between the first laser array 110 and the second laser array 120. Each one of the laser polarized fold mirrors M1 is configured to direct light beams from at least two different directions. The laser polarized fold mirrors M1 may reflect the polarized light beams having the first polarization state (shown in solid lines in the figures), and transmit the polarized light beams having the second polarization state (shown in dotted lines in the figures). In addition, the laser polarized fold mirrors M1 may different spectral characteristics, which correspond to the corresponding laser light sources of different colors. For example, the left laser polarized fold mirror M1 in FIG. 1, which disposed at a position corresponding to the green laser sources G in the first laser array 110 and the second laser array 120, allows S-polarized red light, S-polarized blue light, and P-polarized light to pass through, and reflects only S-polarized green light. The middle laser polarized fold mirror M1 in FIG. 1, which disposed at a position corresponding to the blue laser sources B in the first laser array 110 and the second laser array 120, allows S-polarized red light, S-polarized green light, and P-polarized light to pass through, and reflects only S-polarized blue light. The right laser polarized fold mirror M1 in FIG. 1, which disposed at a position corresponding to the red laser sources R in the first laser array 110 and the second laser array 120, allows S-polarized green light, S-polarized blue light, and P-polarized light to pass through, and reflects only S-polarized red light. With these designs, the laser polarized fold mirrors M1 reflect the polarized light beams L11 emitted by the first laser array 110 and the polarized light beams L12 emitted by the second laser array 120. Moreover, the reflected polarized light beams L11' and L12' have been mixed to some extent. In other words, the polarized light beams L11 emitted by the first laser array 110 can be combined into a polarized light beam L11' through the laser polarized fold mirrors M1, and the polarized light beams L12 emitted by the second laser array 120 can be combined into a polarized light beam L12' through the laser polarized fold mirrors M1. The laser polarized fold mirrors M1 transmit the polarized light beams L13 emitted by third laser array 130. Moreover, the polarized light beams L13 are not combined by the laser polarized fold mirrors M1. According to some embodiments, the first laser array 110 and the first portion 132 may share a first group of laser polarized fold mirrors M11 of the one or more laser polarized fold mirrors M1, and the second laser array 120 and the second portion 134 may share a second group of laser polarized fold mirrors M12 of the one or more laser polarized fold mirrors M1.

According to some embodiments, the light mixing module 102 may further comprise a condenser 140. The condenser 140 is disposed at a light downstream side of the laser polarized fold mirrors M1. Moreover, the third laser array 130 is disposed at a side of the laser polarized fold mirrors M1 opposite to the condenser 140. The polarized light beams L11 emitted by the first laser array 110, the polarized light beams L12 emitted by the second laser array 120, and the polarized light beams L13 emitted by the third laser array 130 are directed by the laser polarized fold mirrors M1 to the condenser 140 and combined. Specifically, the polarized light beams L11 emitted by the first laser array 110 are reflected by the first group of laser polarized fold mirrors M11 to the condenser 140. Moreover, after passing through the first group of laser polarized fold mirrors M11, the polarized light beams L11 are combined into a polarized light beam L11'. Polarized light beams L13 emitted by the first portion 132 of the third laser array 130 are transmitted through the first group of laser polarized fold mirrors M11 to the condenser 140. The polarized light beams L12 emitted by the second laser array 120 are reflected by the second group of laser polarized fold mirrors M12 to the condenser 140. Moreover, after passing through the second group of laser polarized fold mirrors M12, the polarized light beams L12 are combined into a polarized light beam L12'. Polarized light beams L13 emitted by the second portion 134 of the third laser array 130 are transmitted through the second group of laser polarized fold mirrors M12 to the condenser 140. Then, the polarized light beams L11', L2', and L3 are combined into a polarized light beam L1 by the condenser 140.

The lens module 104 is disposed at a light downstream side of the light mixing module 102. The lens module 104 may comprise, for example, a fold mirror 150, a diffuser 152, a diffuser wheel 154, and a diffuser 156, but the disclosure is not limited thereto. The light beam L1 is reflected by the fold mirror 150, and further passes through the diffuser 152, the diffuser wheel 154, and the diffuser 156 as well as the following light pipe 106 and the illuminating system 108. Then, the laser projector 10 can project light to the outside through the illuminating system 108.

Figure 3:
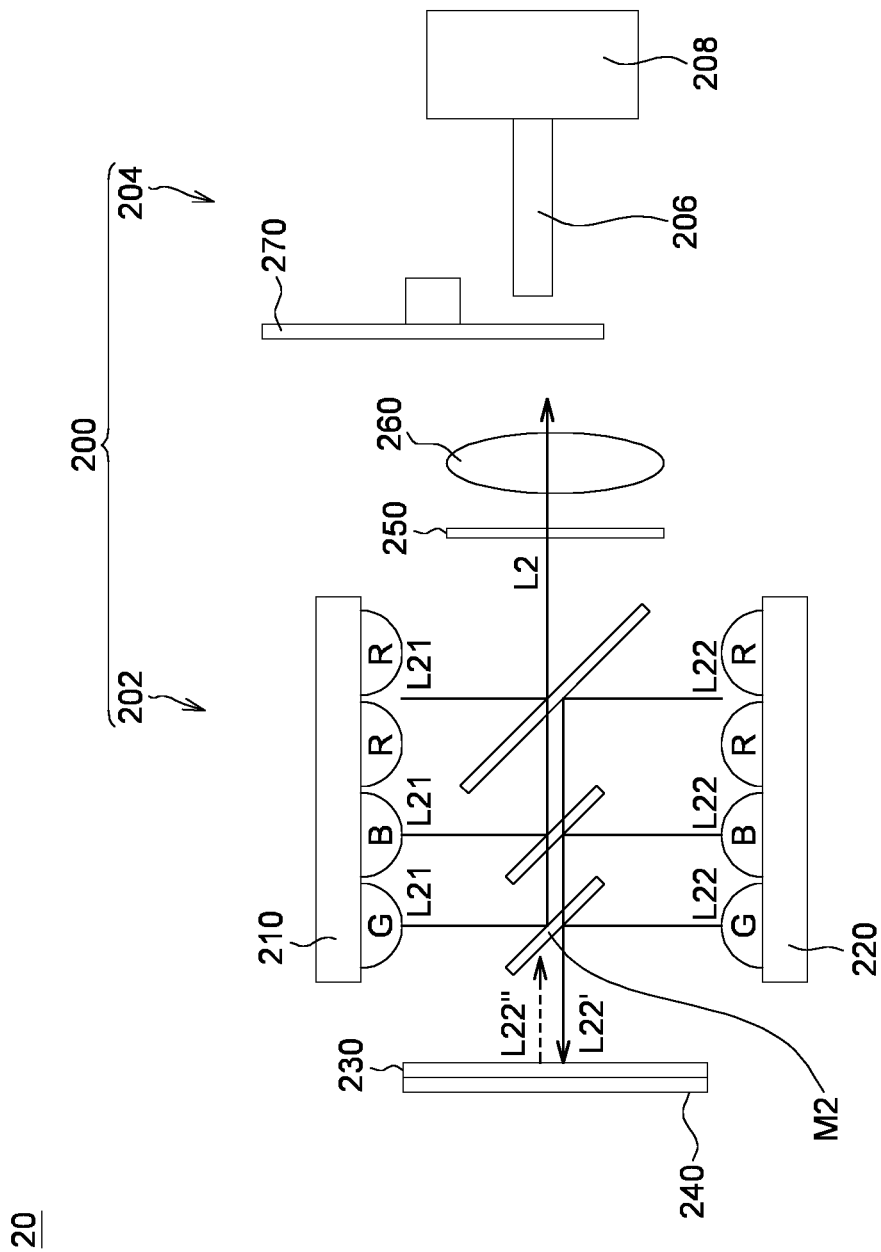
FIG. 3 schematically shows still another exemplary laser projector.

Referring to FIG. 3, another exemplary laser projector 20 is shown. The laser projector 20 has a light mixing module 202 according to embodiments. Specifically, the laser projector 20 comprises a light source system 200. The light source system 200 comprises a light mixing module 202 comprises a light mixing module 204, the details of which will be provided in following paragraphs. The laser projector 20 further comprises a light pipe 206 and an illuminating system 208. The light pipe 206 is disposed at a light downstream side of the light source system 200. The illuminating system 208 is disposed at a light downstream side of the light pipe 206.

As to the light source system 200, the light mixing module 202 comprises a first laser array 210 and a second laser array 220. The first laser array 210 is configured for emitting a plurality of polarized light beams L21 having a first polarization state. The second laser array 220 is configured for emitting a plurality of polarized light beams L22 having the first polarization state. The first polarization state is, for example, S polarization state, but not limited thereto. The polarized light beams having the first polarization state are shown in solid lines in the figures. The second laser array 220 is disposed opposite to the first laser array 210. According to some embodiments, laser sources of different colors may be disposed in the first laser array 210 and the second laser array 220 in a symmetrical manner. As shown in FIG. 3, red laser sources R, green laser sources G, and blue laser sources B are each disposed in the first laser array 210 and the second laser array 220 in a symmetrical manner. It can be understood that the combination of the RGB laser light sources are provided only for example. Other combinations of laser light sources of different colors, different light source arrangements, and/or the like may be used in the first laser array 210 and the second laser array 220. However, the uniformity of polychromatic composite light will be better.

The light mixing module 202 comprises one or more laser polarized fold mirrors M2. The laser polarized fold mirrors M2 are disposed between the first laser array 210 and the second laser array 220. Each one of the laser polarized fold mirrors M2 is configured to direct light beams from at least two different directions. The laser polarized fold mirrors M2 may reflect the polarized light beams having the first polarization state (shown in solid lines in the figures), and transmit the polarized light beams having the second polarization state (shown in dotted lines in the figures). In addition, the laser polarized fold mirrors M2 may different spectral characteristics, which correspond to the corresponding laser light sources of different colors. For example, the left laser polarized fold mirror M2 in FIG. 3, which disposed at a position corresponding to the green laser sources G in the first laser array 210 and the second laser array 220, allows S-polarized red light, S-polarized blue light, and P-polarized light to pass through, and reflects only S-polarized green light. The middle laser polarized fold mirror M2 in FIG. 3, which disposed at a position corresponding to the blue laser sources B in the first laser array 210 and the second laser array 220, allows S-polarized red light, S-polarized green light, and P-polarized light to pass through, and reflects only S-polarized blue light. The right laser polarized fold mirror M2 in FIG. 3, which disposed at a position corresponding to the red laser sources R in the first laser array 110 and the second laser array 120, allows S-polarized green light, S-polarized blue light, and P-polarized light to pass through, and reflects only S-polarized red light. With these designs, the laser polarized fold mirrors M2 reflect the polarized light beams L21 emitted by the first laser array 210 and the polarized light beams L22 emitted by the second laser array 220. Moreover, the reflected polarized light beams have been mixed to some extent. In other words, the polarized light beams L21 emitted by the first laser array 210 can be combined through the laser polarized fold mirrors M2 (not shown), and the polarized light beams L22 emitted by the second laser array 22 can be combined into a polarized light beam L22' through the laser polarized fold mirrors M2.

The light mixing module 202 may further comprise a quarter-wave plate 230, a mirror 240, an optional diffuser 250, and a condenser 260. The quarter-wave plate 230 and the mirror 240 are disposed at a side of the one or more laser polarized fold mirrors M2 opposite to the condenser 260. The optional diffuser 250 is disposed at a light upstream side of the condenser 260. The first laser array 210 and the second laser array 220 share a group of laser polarized fold mirrors of the one or more laser polarized fold mirrors M2. The polarized light beams L21 emitted by the first laser array 210 are reflected by the group of laser polarized fold mirrors to the condenser 260. The polarized light beams L22 emitted by the second laser array 220 are reflected by the group of laser polarized fold mirrors to the quarter-wave plate 230 and the mirror 240, converted to another polarized state by the quarter-wave plate 230 and the mirror 240, and transmitted through the group of laser polarized fold mirrors to the condenser 260. For example, the polarized light beams L22 may be combined by the group of laser polarized fold mirrors into a polarized light beam L22' of S polarization state, and then be converted into circular polarization state by the quarter-wave plate 230, be turned by the mirror 240, pass through the quarter-wave plate 230 again, and become a polarized light beam L22" of P polarization state. When the polarized light beam L22" again passes through the laser polarized fold mirrors M2, the polarized light beam L22" is combined with the reflected polarized light beam L21 into a light beam L2. The light beam L2 further passes through the diffuser 250 and the condenser 260, and enters the lens module 204.

The lens module 204 is disposed at a light downstream side of the light mixing module 202. The lens module 204 may comprise, for example, a diffuser wheel 270, but the disclosure is not limited thereto. The light beam L2 passes through the diffuser wheel 270 as well as the following light pipe 206 and the illuminating system 208. Then, the laser projector 20 can project light to the outside through the illuminating system 208.

In summary, this disclosure provides a light mixing module and a laser projector having the same. A conventional light mixing module uses only a single large condenser for mixing light. In contrast, the light mixing module of the disclosure has two or more laser arrays, and uses laser polarized fold mirrors to mix at least a portion of the light. As such, a smaller condenser may be used, and the volume of the light mixing module can be reduced. In addition, according to some embodiments, the light mixing module of the disclosure may have three laser arrays, such that a laser projector with higher brightness may be provided. According to some embodiments, the light mixing module of the disclosure may have only two laser arrays, such that the volume of the light mixing module can be further reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A light mixing module, comprising:
a first laser array configured for emitting a plurality of polarized light beams having a first polarization state;
a second laser array configured for emitting a plurality of polarized light beams having the first polarization state, the second laser array disposed opposite to the first laser array; and
one or more laser polarized fold mirrors disposed between the first laser array and the second laser array, the one or more laser polarized fold mirrors reflecting the polarized light beams emitted by the first laser array and the polarized light beams emitted by the second laser array;
a condenser disposed at a light downstream side of the one or more laser polarized fold mirrors; and
a third laser array configured for emitting a plurality of polarized light beams having a second polarization state, the third laser array disposed opposite to the condenser;
wherein the one or more laser polarized fold mirrors reflecting the polarized light beams emitted by the first laser array and the polarized light beams emitted by the second laser array tilt towards the condenser; and
wherein each one of the one or more laser polarized fold mirrors is configured to direct light beams from at least two different directions.

2. The light mixing module according to claim 1, wherein the polarized light beams emitted by the first laser array and the polarized light beams emitted by the second laser array are directed by the one or more laser polarized fold mirrors to the condenser and combined.

3. The light mixing module according to claim 1, wherein the third laser array comprises a first portion and a second portion;
wherein the one or more laser polarized fold mirrors transmit the polarized light beams emitted by the third laser array; and
wherein the first laser array and the first portion share a first group of laser polarized fold mirrors of the one or more laser polarized fold mirrors, and the second laser array and the second portion share a second group of laser polarized fold mirrors of the one or more laser polarized fold mirrors.

4. The light mixing module according to claim 3, wherein light sources of at least one same color are disposed in the first portion and the second portion of the third laser array.

5. The light mixing module according to claim 3, wherein the polarized light beams emitted by the first laser array are reflected by the first group of laser polarized fold mirrors to the condenser, polarized light beams emitted by the first portion of the third laser array are transmitted through the first group of laser polarized fold mirrors to the condenser, the polarized light beams emitted by the second laser array are reflected by the second group of laser polarized fold mirrors to the condenser, and polarized light beams emitted by the second portion of the third laser array are transmitted through the second group of laser polarized fold mirrors to the condenser.

6. The light mixing module according to claim 1, wherein laser sources of different colors are disposed in the first laser array and the second laser array in a symmetrical manner.

7. A laser projector, comprising:
a light source system, comprising:
a light mixing module, comprising:
a first laser array configured for emitting a plurality of polarized light beams having a first polarization state;
a second laser array configured for emitting a plurality of polarized light beams having the first polarization state, the second laser array disposed opposite to the first laser array;
one or more laser polarized fold mirrors disposed between the first laser array and the second laser array, the one or more laser polarized fold mirrors reflecting the polarized light beams emitted by the first laser array and the polarized light beams emitted by the second laser array;
a condenser disposed at a light downstream side of the one or more laser polarized fold mirrors; and
a third laser array configured for emitting a plurality of polarized light beams having a second polarization state, the third laser array disposed opposite to the condenser;
wherein the one or more laser polarized fold mirrors reflecting the polarized light beams emitted by the first laser array and the polarized light beams emitted by the second laser array tilt towards the condenser; and
wherein each one of the one or more laser polarized fold mirrors is configured to direct light beams from at least two different directions; and
a lens module disposed at a light downstream side of the light mixing module;
a light pipe disposed at a light downstream side of the light source system; and
an illuminating system disposed at a light downstream side of the light pipe.

8. The laser projector according to claim 7, wherein the polarized light beams emitted by the first laser array and the polarized light beams emitted by the second laser array are directed by the one or more laser polarized fold mirrors to the condenser and combined.

9. The laser projector according to claim 8, wherein the third laser array comprises a first portion and a second portion;
wherein the one or more laser polarized fold mirrors transmit the polarized light beams emitted by the third laser array; and
wherein the first laser array and the first portion share a first group of laser polarized fold mirrors of the one or more laser polarized fold mirrors, and the second laser array and the second portion share a second group of laser polarized fold mirrors of the one or more laser polarized fold mirrors.

10. The laser projector according to claim 9, wherein light sources of at least one same color are disposed in the first portion and the second portion of the third laser array.

11. The laser projector according to claim 9, wherein the polarized light beams emitted by the first laser array are reflected by the first group of laser polarized fold mirrors to the condenser, polarized light beams emitted by the first portion of the third laser array are transmitted through the first group of laser polarized fold mirrors to the condenser, the polarized light beams emitted by the second laser array are reflected by the second group of laser polarized fold mirrors to the condenser, and polarized light beams emitted by the second portion of the third laser array are transmitted through the second group of laser polarized fold mirrors to the condenser.

12. The laser projector according to claim 7, wherein laser sources of different colors are disposed in the first laser array and the second laser array in a symmetrical manner.

* * * * *